United States Patent [19]

Pettijohn

[11] Patent Number: 5,443,351
[45] Date of Patent: Aug. 22, 1995

[54] MOBILE HYDRAULIC CONVEYOR

[76] Inventor: Michael J. Pettijohn, 15111 Oak Rd., Carmel, Ind. 46032

[21] Appl. No.: 32,074

[22] Filed: Mar. 16, 1993

Related U.S. Application Data

[63] Continuation-in-part of Ser. No. 843,222, Feb. 28, 1992, Pat. No. 5,193,971.

[51] Int. Cl.$^6$ ............................................... B60P 1/36
[52] U.S. Cl. ..................... 414/523; 414/528; 198/632
[58] Field of Search ............... 414/502, 503, 504, 505, 414/523; 198/318, 632, 861.1, 861.2, 861.3, 861.4, 861.5

[56] References Cited

U.S. PATENT DOCUMENTS

| | | | |
|---|---|---|---|
| 2,609,115 | 9/1952 | Oklejas . | |
| 2,761,578 | 9/1956 | Brownlee et al. | 414/503 X |
| 2,812,867 | 11/1957 | Anderson | 198/632 X |
| 2,834,487 | 5/1958 | Gaddis | 414/523 |
| 3,085,675 | 4/1963 | Feiteira, Jr. | 198/632 |
| 3,122,251 | 2/1964 | Gardipee . | |
| 3,521,767 | 7/1970 | Rossi | 414/523 |
| 3,616,893 | 11/1971 | Knadle et al. | 198/632 |
| 3,923,175 | 12/1975 | Landratter | 414/523 X |
| 4,157,005 | 6/1979 | Orlando et al. | 198/632 X |
| 4,923,359 | 5/1990 | Petri et al. | 198/861.3 X |
| 5,044,867 | 9/1991 | Pettijohn | 414/523 |

FOREIGN PATENT DOCUMENTS

| | | | |
|---|---|---|---|
| 671067 | 9/1963 | Canada | 414/523 |
| 87685 | 11/1959 | Denmark | 414/744.2 |
| 3625297 | 2/1988 | Germany | 414/523 |
| 1592032 | 7/1981 | United Kingdom | 414/523 |

Primary Examiner—Frank E. Werner
Attorney, Agent, or Firm—Barnes & Thornburg

[57] ABSTRACT

An improvement over a prior art mobile hydraulic conveyor apparatus which is mounted on the rear end of a truck for both vertical and lateral pivoting, as well as vertical storage for transport to different locations. The apparatus is moved vertically by a block and tackle arrangement under hydraulic control. Lateral pivoting is achieved by activation of a pair of hydraulic cylinders which act on the conveyor apparatus to shift the apparatus laterally about a pivot axis extending centrally through a turret connected to the conveyor apparatus and mounted on a turret holder which in turn is pivotally mounted on the rear end of the truck. The turret holder includes a c-ring which is mounted in a circumferential groove formed on the turret. The conveyor apparatus includes two pivotally connected trays which support a hydraulically driven belt which transports material dispersed from the truck to a selected location. During transport the trays may be pivoted upwardly in a folded position by providing hydraulic power to the block and tackle arrangement. The rear end of the truck includes a slidable panel which is hydraulically lifted to enable material carried by the truck to flow onto the conveyor apparatus. The trays may be moved from a folded position to an unfolded position by links connected to the trays actuated by at least one hydraulic cylinder connected to one of the trays and to the links.

9 Claims, 9 Drawing Sheets

FIG. 1 PRIOR ART

PRIOR ART

MOBILE HYDRAULIC CONVEYOR

This application is a continuation-in-part of application Ser. No. 07/843,222 filed Feb. 28, 1992, now U.S. Pat. No. 5,193,971.

BACKGROUND OF THE INVENTION

1. Field Of The Invention

This present invention relates to improvements made on my prior invention disclosed and claimed in my prior application Ser. No. 07/549,071 filed Jul. 6, 1990, which has matured into U.S. Pat. No. 5,044,867, issued Sep. 3, 1991, specifically incorporated herein by reference. More specifically, the improvements relate to the construction of the structural trays, the cover for the conveyor belt mounted on the structural trays, the apparatus controlling the lateral positioning of the conveyor apparatus, hydraulic apparatus for opening and closing a slidable gate at the rear of the truck for purpose supplying the conveyor apparatus with the material carried by the truck, hydraulic apparatus for shifting the trays from a folded vertical position to an extended operating position, and the location of an operating board for controlling the various hydraulic apparatus.

2. Description Of The Related Prior Art

U.S. Pat. No. 2,609,115, issued to Eli Oklejas on Sep. 2, 1952, U.S. Pat. No. 2,834,487, issued to Roy C. Gaddis on May 13, 1958, and U.S. Pat. No. 3,122,251, issued to Walter E. Gardipee on Feb. 25, 1964 were discussed in my above-identified U.S. Pat. No. 5,044,867. In addition, U.S. Pat. Nos. 2,636,628; 3,521,767; 3,923,175; 3,951,279; and 4,253,256; Canadian Patent No. 671,067; and United Kingdom Patent No. 1,592,032 were also cited but not applied in my above-identified U.S. Pat. No. 5,044,867. While the United Kingdom Patent No. 1,592,032 does disclose a hydraulic system 14 for changing the orientation of one tray 7 relative to a second tray 6, the arrangement precludes the 180 degree rotation disclosed herein. Danish Patent No. 87,685 issued November, 1959 was cited but not applied in my pending Parent application Ser. No. 07/843,222 filed Feb. 28, 1992.

SUMMARY AND OBJECTS OF THE INVENTION

As disclosed in my above-identified U.S. Pat. No. 5,044,867, structural trays 11 and 12 were each formed of two suitably connected I-beams 72 to form a tray for guiding conveyor belt 45. Additionally, a conveyor cover 24 was provided over the length of both structural trays 11 and 12 to prevent the material on conveyor belt 45 from being ejected before it reached end roller 31. The lateral positioning of the conveyor belt apparatus was controlled by the selective activation of two side hydraulic cylinders 17 attached to I-beams 72 by an attachment plate 19 and an eyelet arrangement 18, and suitably connected by chain 13 to turret holder 58, whereby the apparatus 10 is laterally swung in one direction or the other depending on the selective operation of one or the other of the hydraulic cylinders 17.

In the improved arrangement, steel tubes having a rectangular cross-section are substituted for the I-beams 72. A bottom plastic cover member is provided to prevent the material carried by conveyor belt 45 from falling to the ground. A plastic conveyor cover is substituted for cover 24 to prevent the material on conveyor belt 45 from being prematurely ejected. In the apparatus controlling the lateral positioning of conveyor apparatus 10, a direct connection of hydraulic cylinders 17 to the turret holder 58 is substituted for the chain connection disclosed in my above-identified U.S. Pat. No. 5,044,867.

Figure 2:
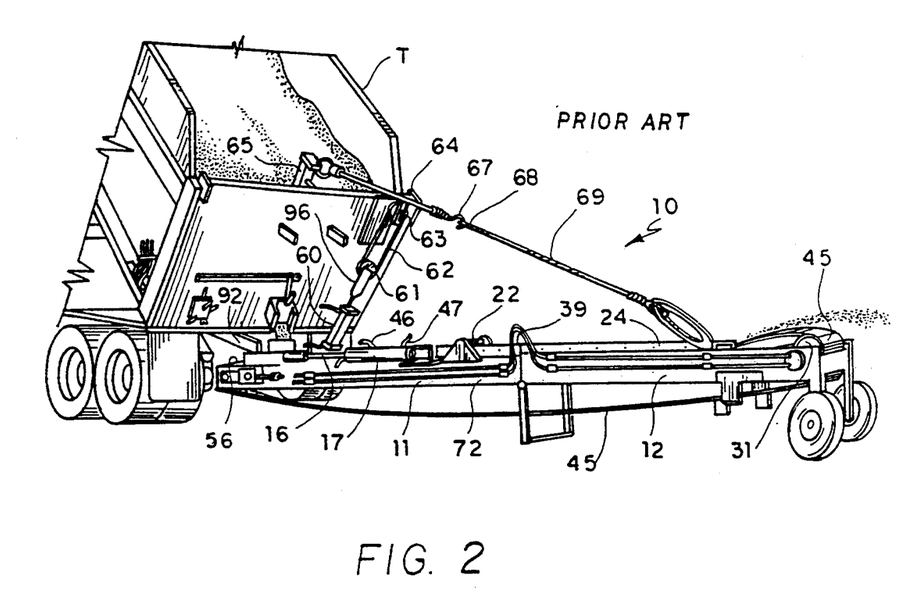
FIG. 2 is a perspective view of the prior art conveyor apparatus shown in the operating position.

Additionally, an hydraulic apparatus is provided to open and close a slidable gate on the rear of the truck as a substitute for the manual opening and closing apparatus shown in FIG. 2, an hydraulic apparatus is provided to control the positioning of one tray relative to another tray through 180 degrees of movement of the one tray relative to the other tray, and a control board is mounted on a side of a truck for controlling the respective hydraulic apparatus.

Accordingly, it is an object of my present invention to improve and strengthen the construction of my "Mobile Hydraulic Conveyor".

It is a further object of my present invention to improve the protective cover arrangement of my "Mobile Hydraulic Conveyor".

It is another object of my present invention to improve the lateral positioning apparatus of my "Mobile Hydraulic Conveyor".

It is still farther object of this invention to improve the opening and closing of a slidable gate on a truck body.

It is an additional object to provide hydraulic means for pivoting one tray relative to a second tray between a folded position and a fully extended position covering 180 degree of rotation.

Other objects, features and advantages of this invention will become apparent from the following detailed description and the appended claims, reference being had to the accompanying drawings forming a part of the specification, wherein like reference numerals designate corresponding parts of the several views.

DETAILED DESCRIPTION OF THE PREFERRED EMBODIMENT

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Figure 1:
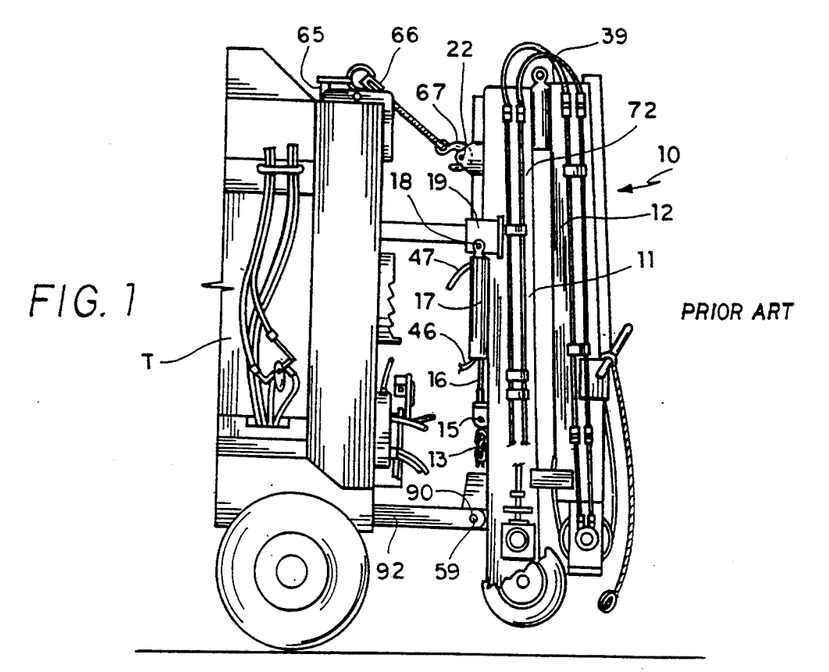
FIG. 1 is a side view of the prior art conveyor apparatus shown in the folded position behind the truck.
Figure 3:
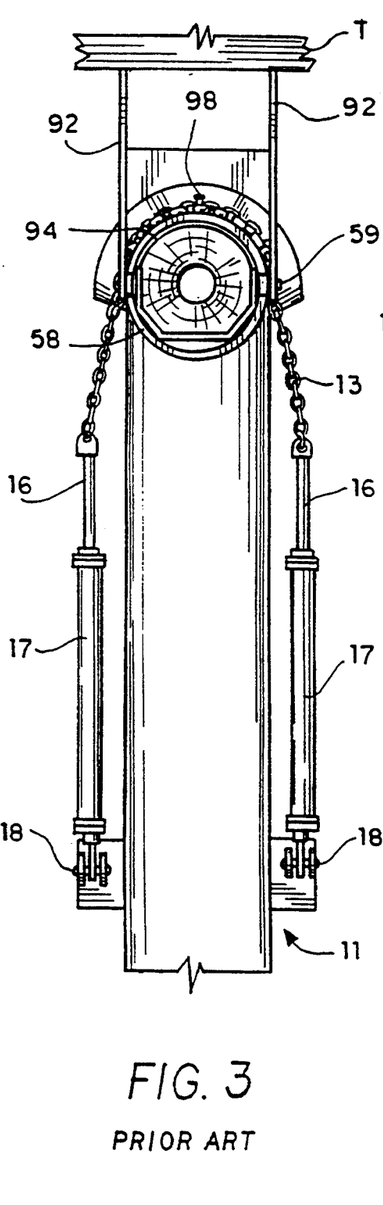
FIG. 3 is a top view showing the prior art chain connection with the turret holder for effecting lateral movement of the conveyor apparatus.

FIGS. 1, 2 and 3 show my prior mobile hydraulic conveyor disclosed and claimed in my prior U.S. Pat. No. 5,044,867 issued Sep. 3, 1991, incorporated herein by specific reference. As shown, the prior art conveyor apparatus 10 is essentially composed of two main structural members, an attached structural tray 11 which is attached to a truck T in a manner to permit both vertical pivoting and lateral movement of conveyor apparatus 10 relative to truck T, and a foldable structural tray 12 which is attached to structural tray 11 at a transverse pivot or folding joint 39.

Structural trays 11 and 12 are composed each of two I-beam members 72 which provide a rigid structural support for the various components of the conveyor apparatus 10. Structural tray 11 is pivotally mounted by horizontal pivot pin 59 which is parallel to the back of truck T, pin 59 passing through holes 90 provided in bars 92 fixed to and extending perpendicularly from the rear of truck T. Bars 92 support a turret holder 58 carrying a turret 94 which supports conveyor apparatus 10 for lateral movement. The lateral movement is achieved by two independently operated side hydraulic cylinders 17 pivotally mounted on a structural attachment plate 19 by eyelets 18, there being one structural attachment plate 19 on each side of the attached structural tray 11 integral with the respective I-beam 72. The eyelets 18 are affixed to plates 19 to compensate for any vertical displacement of the conveyor apparatus 10.

Each side hydraulic cylinder 17 has a piston 16 connected by an eyelet 15 to one end of a chain 13, the central portion of which is fixedly connected to turret holder 58. To shift conveyor apparatus 10 laterally, one or both of the hydraulic cylinders 17 are actuated in opposing fashion such that one piston 16 is extended while the other piston 16 is retracted, thereby establishing coacting forces at eyelets 18 to laterally swing conveyor apparatus 10 about the axis of rotation of turret 94. Chain 13 is connected to turret holder 58 by pin 98 as shown in FIG. 3.

Vertical shifting of conveyor apparatus 10 is achieved by a block and tackle arrangement 61,63 and a hydraulic cylinder 60. Cable 62 extends around a pulley 66 connected to a vertical pole 65 attached to the rear of truck T, around the pulleys 64 of the block and tackle arrangement 62,63 which extends vertically from height cylinder 60. One of the free ends of cable 62 attaches to the piston 96 of height cylinder 60. The other free end of cable 62 has a hook 67 which may be selectively connected either to a connecting rod 22 on structural tray 11 to retain trays 11 and 12 in a folded vertical position as in FIG. 1, or to a loop 68 of a fixed length cable 69 attached to structural tray 12 to retain trays 11 and 12 in the operating position, as in FIG. 2.

Conveyor apparatus 10 includes a movable belt 45, which passes over a motorized roller 31. Hydraulic cylinders 17, 60, and motorized roller 31 are connected to hydraulic lines fed from truck T. Belt 45 is covered by a conveyor cover 24 which prevents material on belt 45 from being ejected before the material reaches motorized roller 31.

Further description of the prior art mobile hydraulic conveyor apparatus 10 can be found in my earlier U.S. Pat. No. 5,044,867.

Figure 4:
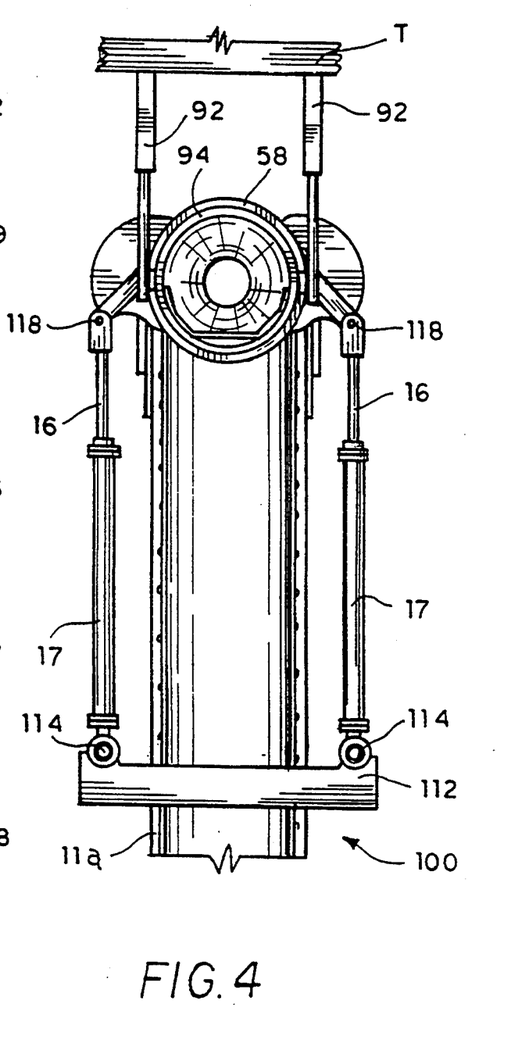
FIG. 4 is a top view of the improved connection between the improved conveyor apparatus and the turret holder.
Figures 5, 6:
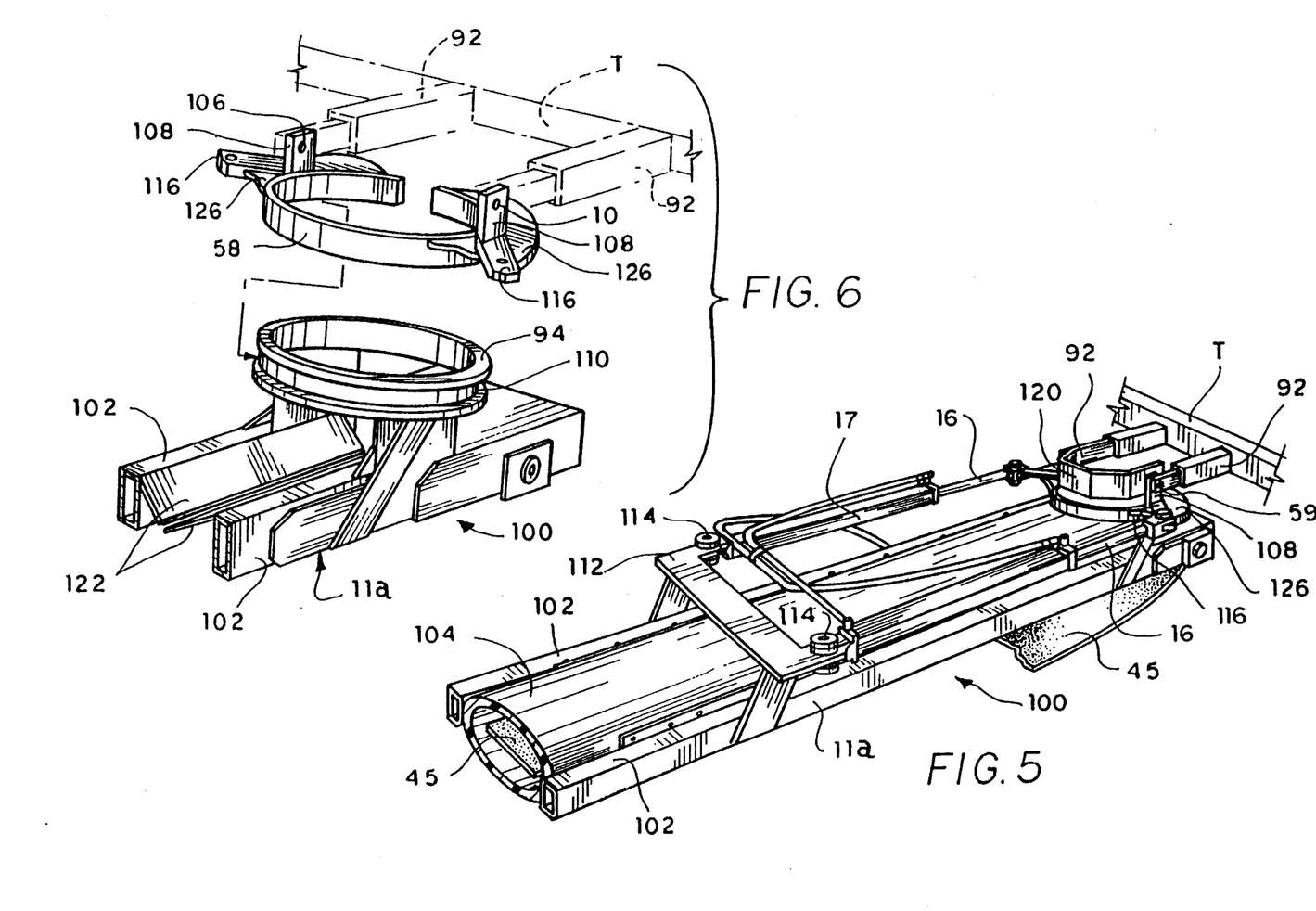
FIG. 5 is a partial perspective view of the improved conveyor apparatus.
FIG. 6 is an exploded perspective view of the turret mounting.

My improved conveyor apparatus 100, shown in FIGS. 4, 5 and 6, comprises tube steel side beams 102 substituted for I-beam members 72, a plastic cover 104 which completely covers the outgoing portion of belt 45 and which is substituted for cover 24, and a direct connection between the side hydraulic cylinders 17 and turret holder 58, substituted for the indirect connection involving chain 13. The several modifications are further discussed below.

In FIG. 6, the turret mounting is shown in an exploded perspective view. Turret holder 58 is shown to be C-shaped in configuration and is mounted on extendable bars 92 by pivot pins 59 passing through holes 106 formed in vertical ears 108 integral with turret holder 58, and holes 90 in bars 92. Turret holder 58 rides in a groove 110 formed in turret 94 attached to tray 11a through tubular side beams 102.

Hydraulic cylinders 17 are pivotally mounted on a cross bar 112 as at pivot pins 114. Piston 16 is pivotally connected to horizontal ears 116 on turret holder 58 through pivot pins 118. Cross bar 112 is fixedly connected to tray 11a at tubular side beams 102. Mounted on turret 94 for movement therewith is a guard 120 which helps to direct the material being disbursed from truck T into the central opening 124 in turret 94 onto belt 45. Hydraulic cylinders 17 are connected to the hydraulic system of truck T through supply line 46 and return line 47.

In operation, hydraulic cylinders 17, when actuated, act on cross bar 112 and fixed horizontal ears 116 to laterally move conveyor apparatus 100 about the axis of rotation of turret 94 which is perpendicular to the plane of turret 94.

Support for the material carrying portion of belt 45 can be sloped plastic guide plates 122 as shown in FIG. 6, or a plastic cover arrangement 104 as shown in FIG. 5, which replaces cover 24 in the prior art conveyor apparatus 10.

In the prior art best shown in FIG. 2, tailgate 80 of truck T conventionally has a slidable gate 82 which is manually operated by linkage 84, 86. When the slidable gate 82 is in the open position, the material 88 carried by truck T is able to flow to the conveyor belt 45.

Figure 7:
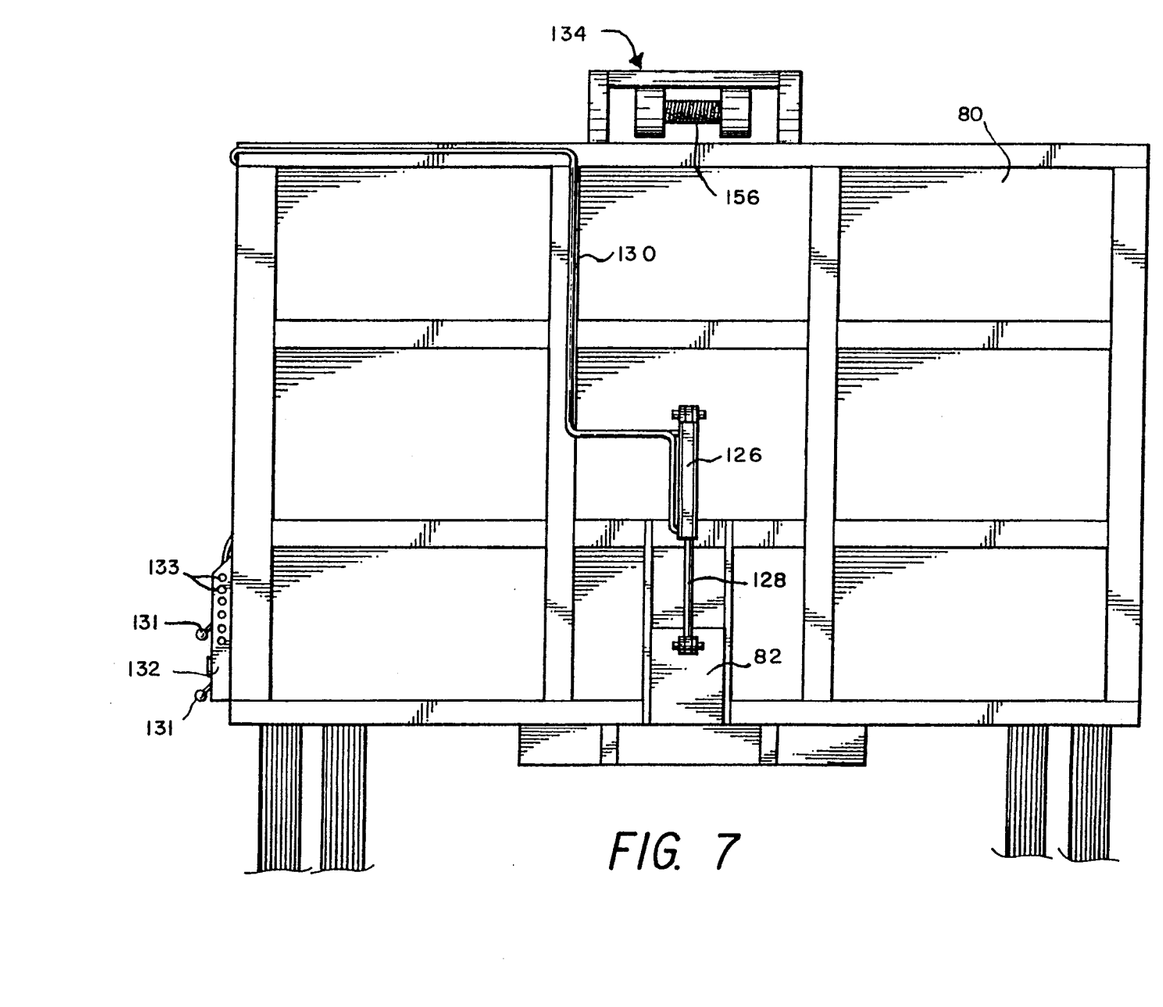
FIG. 7 is a rear view of a truck showing hydraulic apparatus for raising and lowering a gate.
Figure 8:
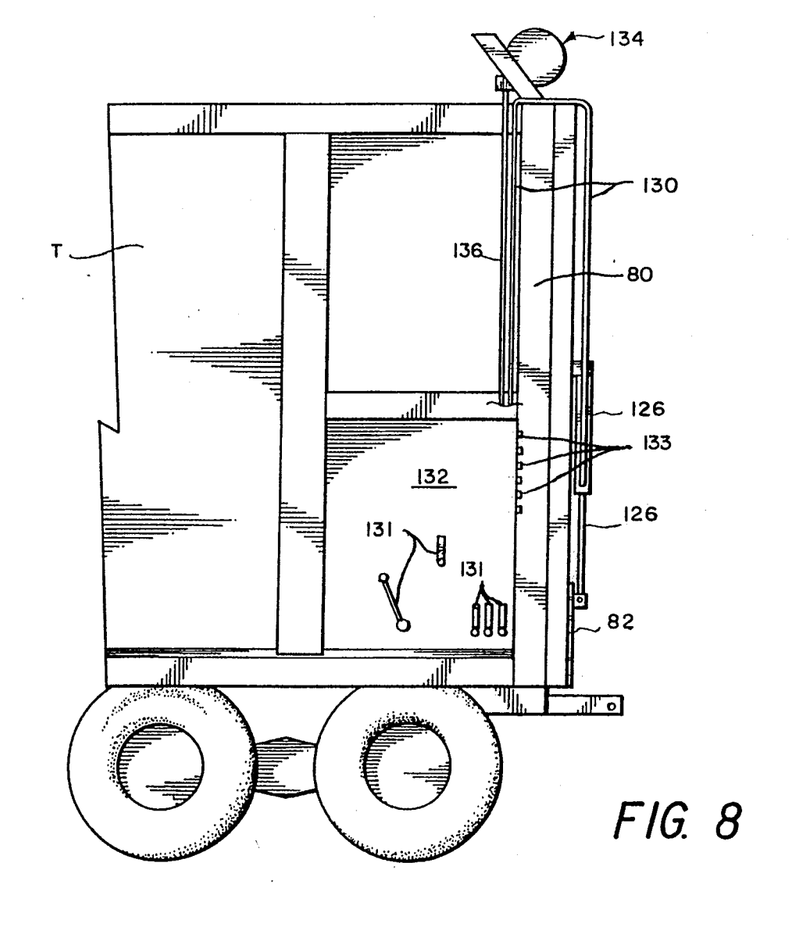
FIG. 8 is a side view of the truck of FIG. 7 showing the apparatus for raising and lowering the gate and the location of a control board for the hydraulic system.
Figure 9:
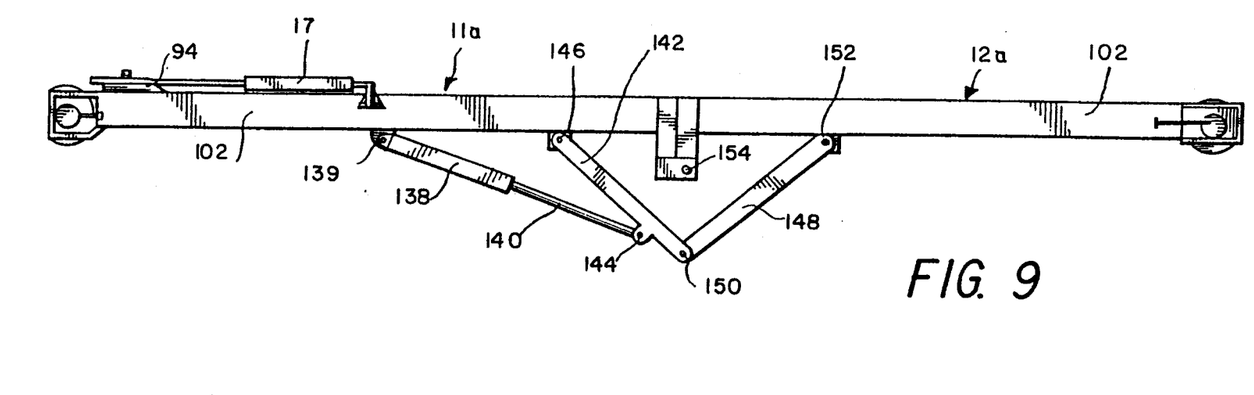
FIG. 9 is a side view of the trays in an unfolded operational position together with a first hydraulic apparatus for controlling the relative position of the trays.

In a preferred modified arrangement shown in FIGS. 7 and 8, an hydraulic cylinder 126 is suitably mounted on tailgate 80, the piston rod 128 thereof being connected to slidable gate 82. A hydraulic line 130 connects cylinder 126 to the hydraulic system of trucks through control board 132 mounted on a side of the truck T, best shown in FIG. 8. Also mounted on the tailgate 80 is a hydraulic winch 134 which may be used, by way of example only, to reel in cable 69. Winch 134 is connected to the hydraulic system of truck T through hydraulic line 136 and control board 132. Control board 132 includes conventional switching means 131 and connecting means 133 for operating the several hydraulic cylinders.

In FIGS. 9–14 there is shown improved hydraulic systems for folding and unfolding trays 11a and 12a shown in schematic form. In a first arrangement shown in FIGS. 9 and 10, a first hydraulic cylinder 138 is pivotally mounted below tray 11a at pivot 139. A piston rod 140 is pivotally connected to a first link 142 at pivot 144. Link 142 is pivoted at one end to the bottom of tray 11a at pivot 146 and at the other end to the end of a second link 148 as at pivot 150. Second link 148 is pivoted to the bottom of tray 12a at pivot 152. Trays 11a and 12a are suitably pivoted together at pivot 154. While only one hydraulic cylinder and only one pair of links are shown in FIGS. 9–14, a duplicate hydraulic cylinder and a duplicate pair of links connected respectively to each side of trays 11a and 12a may be provided if found to be desireable within the scope of the claims.

Figure 10:
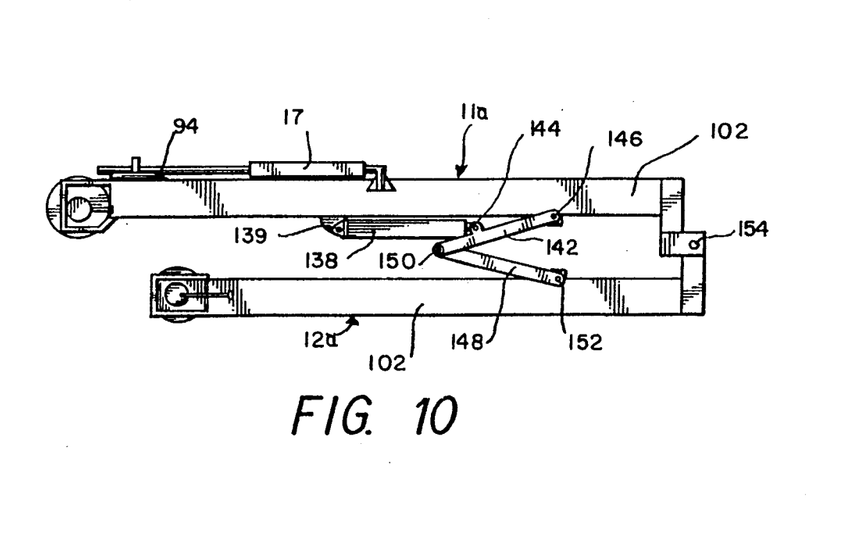
FIG. 10 is a side view of the trays of FIG. 9 in the folded position under the control of the first hydraulic apparatus.

In operation, when piston rod 140 is withdrawn into the first hydraulic cylinder 138 as shown in FIG. 10, tray 12a is pivoted about pivot 154 in a clockwise direction by links 142, 148. Trays 11a and 12a may be pivoted to the vertical position similar to that indicated by FIG. 1 by winch 134 connected by a cable 156 to tray 11 in manner similar to cable 69 in FIG. 2.

Figure 11:
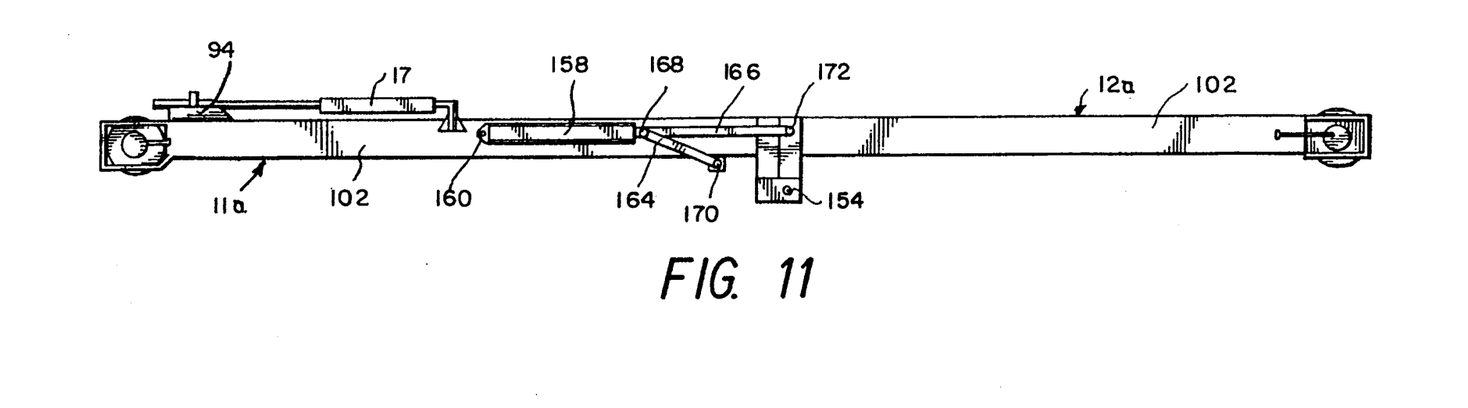
FIG. 11 is a side view similar to FIG. 9 showing the trays in the unfolded operational position under the control of a second hydraulic apparatus.
Figure 12:
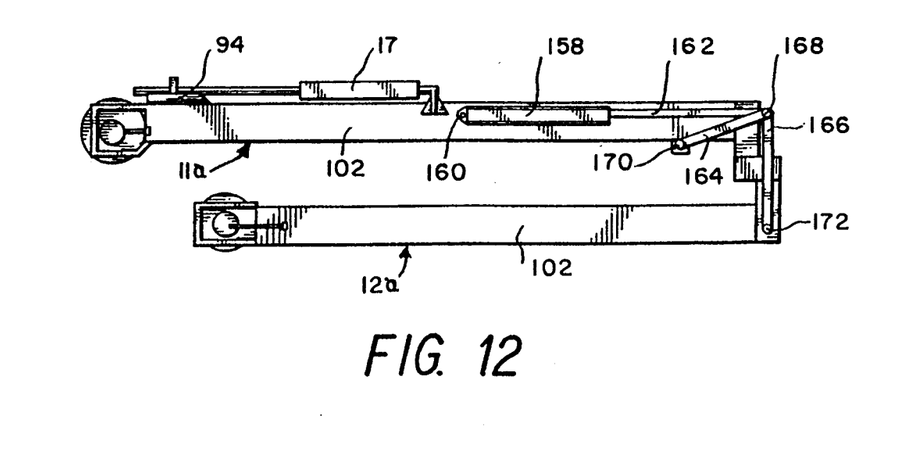
FIG. 12 is a side view similar to FIG. 10 showing the trays in the folded position under the control of the second hydraulic apparatus.

FIGS. 11 and 12 disclose a second hydraulic arrangement for controlling the folding and unfolding of trays 11a and 12a. A second hydraulic cylinder 158 is pivotally mounted at 160 to a side of tray 11a. A piston rod 162 extending from cylinder 158 is pivotally connected to both link 164 and link 166 at pivot 168. Link 164 is pivoted below tray 11a at pivot 170. Link 166 is pivoted to tray 12a above pivot 154 at pivot 172. It is intended that there be two hydraulic cylinders 158 and two sets of links 164, 166, one hydraulic cylinder 158 and one set of links 164, 166 being located on each side of trays 11a and 12a. Further, the hydraulic cylinders 158 and links 164, 166 may be located on either side of side beams 102 forming trays 11a and 12a as desired.

In practice, when hydraulic cylinder is activated to extend piston rod 162 from cylinder 158 tray 12a is rotated clockwise about pivot 154 to the folded position as shown in FIG. 12. Conversely, when piston rod 162 is withdrawn, trays 11a and 12a are positioned as shown in A third hydraulic cylinder arrangement is found in FIGS. 13 and 14. In this third arrangement a single cylinder 174 is pivotally mounted on top of tray 11a at pivot 176. Piston rod 178 carried by cylinder 174 is pivotally connected to links 180 and 182 at pivot 184. The other end of link 180 is pivotally connected to tray 11a at the top thereof through pivot 186. Link 182 is pivotally connected to tray 12a at pivot 188. In operation, when cylinder 174 is actuated to extend piston rod 178, tray 12a is forced to pivot about pivot 154 in the clockwise direction to the FIG. 14 folded position.

Figure 13:
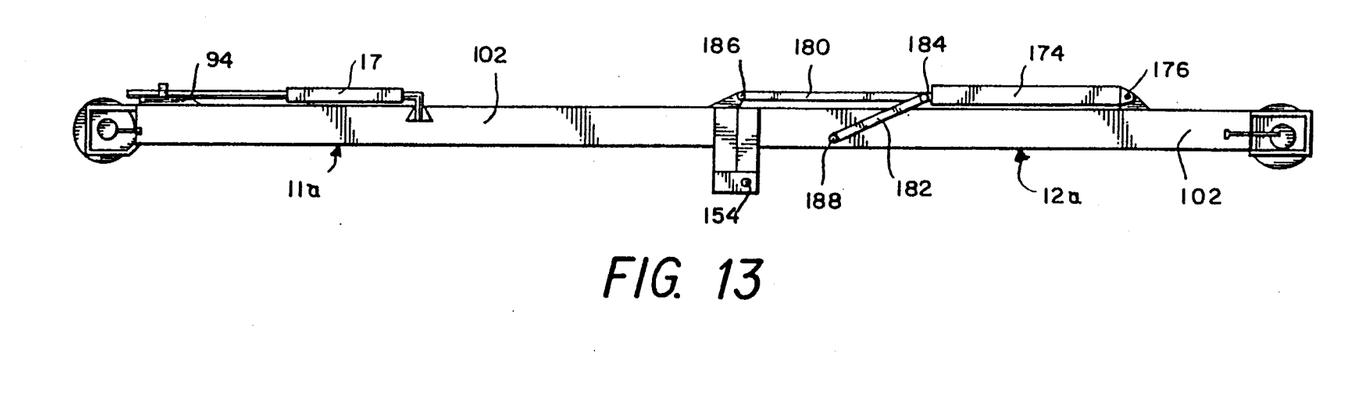
FIG. 13 is a side view similar to FIG. 9 showing the trays in the unfolded operational position under the control of a third hydraulic apparatus.
Figure 14:
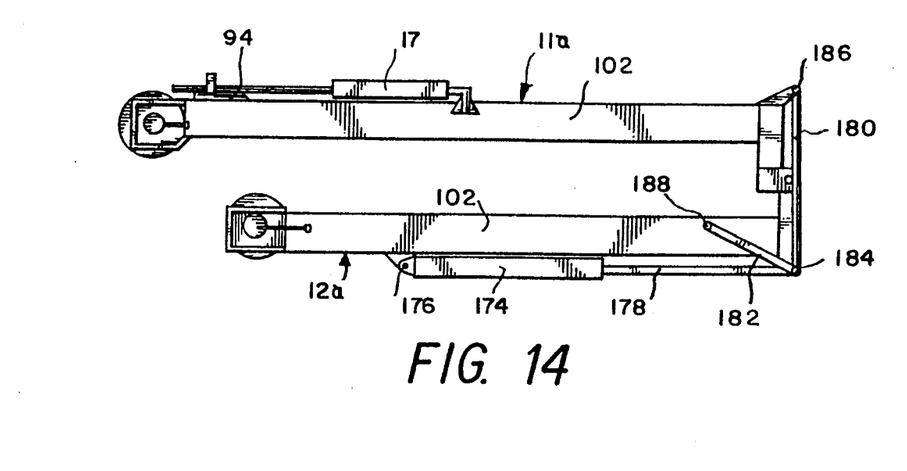
FIG. 14 is a side view similar to FIG. 10 showing the trays in the folded position under the control of the third hydraulic apparatus.

Conversely, when cylinder 174 is actuated to withdraw piston rod 178 into the cylinder, tray 12a pivots around pivot 154 to reach the FIG. 13 unfolded position.

In the embodiments of FIGS. 11, 12 13 and 14, the respective links 166 and 180 will often reach an overcenter position with regard to pivot 154. It should be remembered that conveyor apparatus 10, when transported by truck T, is carried in the vertical position illustrated, by way of example only, in FIG. 1. When it is desired to use the conveyor apparatus the practice is to tilt the truck body as shown in FIG. 2, thereby enabling gravity to move trays 12, 12a sufficient distance to enable links 166, 180 to again pass the over center position, whereby the respective hydraulic cylinders may do their job of unfolding the trays as shown in FIGS. 11 and 13.

Figure 15:
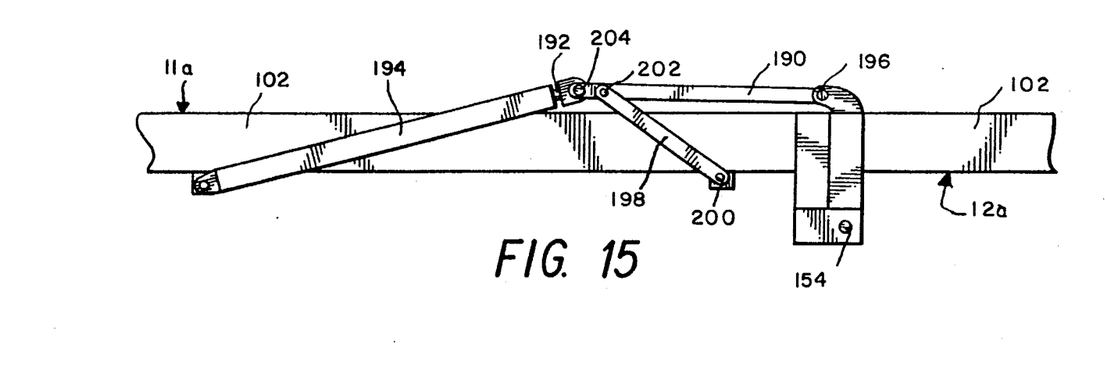
FIG. 15. is a side view similar to FIG. 9 showing the trays in the unfolded operational position under the control of a fourth hydraulic apparatus, the arrangement being such that overcentering is prevented.
Figure 16:
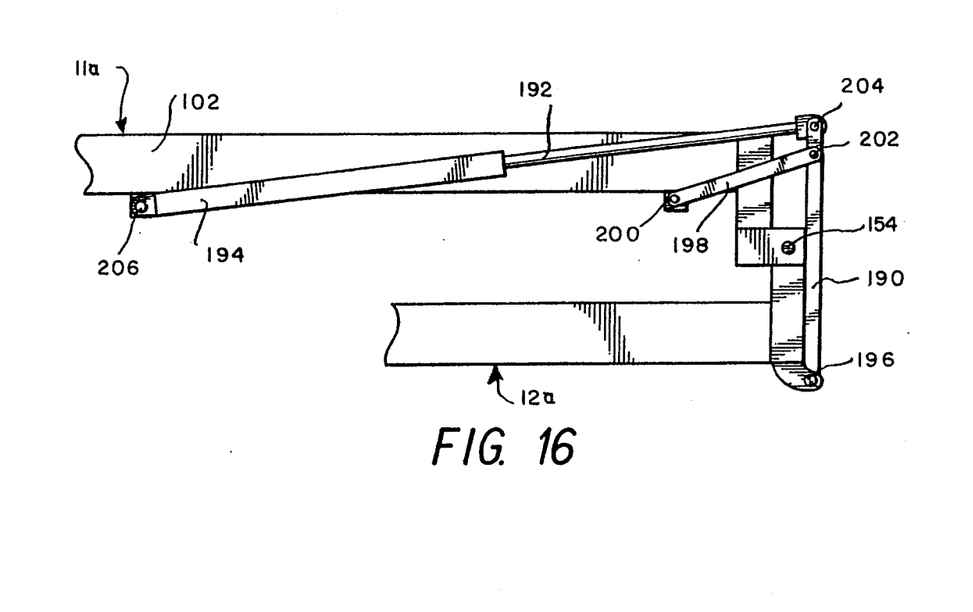
FIG. 16 is a side view similar to FIG. 10 showing the trays in a folded position under the control of the fourth hydraulic apparatus.

In FIGS. 15 and 16 a conveyor apparatus disclosed in which the operative link does not pass over the center of pivot 154. Drag link 190 is pivotally connected at pivot 204 to a piston rod 192 contained within an hydraulic cylinder 194 as shown in FIG. 16, and to a portion of tray 12a at pivot 196. Hydraulic cylinder 194 is pivotally mounted at pivot 206 on tray 11a. Pivot link 198 is also pivoted at pivot 200 to tray 11a and at pivot 202 to drag link 190. Since pivots 154 and 196 are offset from one another it is clear that drag link 190 will not move over center with respect to pivot 154, and accordingly the folding and unfolding of trays 11 and 12, 11a and 12a, will proceed smoothly.

In my prior U.S. Pat. No. 5,044,867 apparatus 10 included support wheels 25 which add a significant amount of weight to weight to apparatus 10. It should be noted, however, that wheels 25 are not absolutely necessary, and in the embodiments of FIGS. 9, 11 and 13 wheels 25 have been omitted.

While it will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

I claim:

1. In a mobile hydraulic conveyor apparatus pivotally attachable to a rear end of a truck, said conveyor apparatus including a first elongated tray and second elongated tray pivotally attached at one end to each other, thereby enabling said trays to be folded during transport thereof from one location to another and to be unfolded to an unfolded operative position for supporting a conveyor belt, an improvement comprising:

means for folding and unfolding said trays, said folding and unfolding means including a hydraulic cylinder having a longitudinal axis, the hydraulic cylinder being pivotally mounted on said first tray about a pivot connection so that the longitudinal axis of the hydraulic cylinder is generally parallel to a longitudinal axis of the first tray when the first and second trays are in the unfolded position, a piston rod carried by said at least one hydraulic cylinder, the piston rod being movable from an extended position to a retracted position within the hydraulic cylinder, a linkage and means for coupling the linkage means to the first and second trays and to the piston rod so that operation of said hydraulic cylinder to move the piston rod from the extended position to the retracted position causes the first and second trays to move to the unfolded position, and movement of the piston rod from the retracted position to the extended position causes the first and second trays to move to a folded position.

2. A mobile hydraulic apparatus as in claim 1, said hydraulic cylinder being pivotally mounted to the first tray by a pivot connection coupled to a side surface of said first tray, said linkage comprising a first link pivotally connected between the piston rod carried by said hydraulic cylinder and a portion of said second tray, and a second link pivotally mounted on said first tray and pivotally connected to said piston rod and said first link, whereby when said piston rod is fully inserted into said hydraulic cylinder said first and second trays are disposed in the unfolded position, and when said piston rod is fully extended from said hydraulic cylinder said first and second trays are in the folded position.

3. A mobile hydraulic apparatus as in claim 2, wherein the pivotal connection between said first link and a portion of said second tray is offset relative to a pivot connecting said first and second trays, whereby said linkage means does not travel over a center of said pivot connecting said first and second trays.

4. A mobile hydraulic apparatus as in claim 1, wherein said hydraulic cylinder is pivotally mounted on said second tray, said linkage comprising a first link connected between a piston rod carried by said at least one hydraulic cylinder and a portion of said first tray, and a second link pivotally mounted on said second tray and pivotally connected to said piston rod and said first link, whereby, when said piston rod is fully inserted into said at least one cylinder said first and second trays are moved to the unfolded position, and when aid piston rod is fully extended from said at least one hydraulic cylinder said first and second trays are moved to the folded position.

5. A mobile hydraulic conveyor apparatus configured to be pivotally coupled to a truck, said conveyor apparatus comprising:

a first elongated conveyor tray;

a second elongated conveyor tray pivotally coupled to the first tray by about a pivot point, thereby enabling the first and second trays to be moved from a folded position during transport from one location to another to an unfolded end-to-end operative position for supporting a conveyor belt;

a hydraulic cylinder pivotally coupled to the first tray;

a piston rod located within the hydraulic cylinder, the piston rod being movable from an extended position to a retracted position within the hydraulic cylinder;

a drag link having a first end and a second end, the first end of the drag link being pivotally coupled to the second tray, and the second end of the drag link being pivotally coupled to the piston rod about a pivot connection;

a pivot link having a first end and a second end, the first end of the pivot link being pivotally coupled to the first tray, and the second end of the pivot link being pivotally coupled to the drag link at a pivot location spaced apart from the pivot connection of the drag link and the piston rod so that movement of the piston rod in the hydraulic cylinder from the extended position to the retracted position causes the first and second trays to move to the unfolded end-to-end position, and movement of the piston rod in the hydraulic cylinder from the retracted position to the extended position causes the first and second trays to move to the folded position.

6. The conveyor apparatus of claim 5, wherein the hydraulic cylinder has a longitudinal axis, the hydraulic cylinder being mounted on the first tray so that the longitudinal axis of the hydraulic cylinder is generally parallel to a longitudinal axis of the first tray.

7. The conveyor apparatus of claim 5, wherein the hydraulic cylinder is pivotally mounted to the first tray by a pivot located below a bottom surface of the first tray, the pivot link is pivotally mounted to the first tray by a pivot located below the bottom surface of the first tray, and the drag link is pivotally mounted to the second tray by a pivot located above a top surface of said second tray.

8. The conveyor apparatus of claim 5, wherein the hydraulic cylinder is pivotally mounted on a side surface of the first tray.

9. The conveyor apparatus of claim 5, wherein a pivotal connection between the drag link and the second tray is offset relative to the pivot point connecting the first tray and the second tray.

* * * * *